US012596178B2

(12) United States Patent
Robertson, Jr. et al.

(10) Patent No.: US 12,596,178 B2
(45) Date of Patent: Apr. 7, 2026

(54) SENSOR ASSEMBLY

(71) Applicant: Ford Global Technologies, LLC,
Dearborn, MI (US)

(72) Inventors: Michael Robertson, Jr., Garden City,
MI (US); Venkatesh Krishnan, Canton,
MI (US); Tyler D. Hamilton,
Farmington, MI (US); **Rashaun
Phinisee,** Ypsilanti, MI (US)

(73) Assignee: Ford Global Technologies, LLC,
Dearborn, MI (US)

( * ) Notice: Subject to any disclaimer, the term of this
patent is extended or adjusted under 35
U.S.C. 154(b) by 774 days.

(21) Appl. No.: 18/067,830

(22) Filed: Dec. 19, 2022

(65) Prior Publication Data

US 2024/0201333 A1 Jun. 20, 2024

(51) Int. Cl.
G01S 7/481 (2006.01)
G01S 7/4865 (2020.01)
G01S 17/931 (2020.01)

(52) U.S. Cl.
CPC .......... G01S 7/4813 (2013.01); G01S 7/4817
(2013.01); G01S 7/4865 (2013.01); **G01S
17/931** (2020.01)

(58) Field of Classification Search
CPC .... G01S 7/4813; G01S 7/4817; G01S 7/4865;
G01S 17/931; G01S 13/86; G01S 17/86
See application file for complete search history.

(56) References Cited

U.S. PATENT DOCUMENTS

| | | | | |
|---|---|---|---|---|
| 10,189,450 | B2 * | 1/2019 | Rice | B60S 1/52 |
| 2020/0188965 | A1 | 6/2020 | Monrad | |
| 2024/0103145 | A1 * | 3/2024 | Yang | G01S 7/497 |

FOREIGN PATENT DOCUMENTS

| | | |
|---|---|---|
| CN | 112660072 A | 4/2021 |
| EP | 0557224 A1 | 8/1993 |
| EP | 3481683 B1 | 10/2020 |
| JP | 4213398 B2 | 1/2009 |

* cited by examiner

*Primary Examiner* — Tony Ko
(74) *Attorney, Agent, or Firm* — Frank A. MacKenzie;
Brooks Kushman P.C.

(57) ABSTRACT

A sensor assembly includes a housing, a sensor unit attached
to the housing, and a brush having a plurality of bristles. The
sensor unit includes a shell defining a vertical axis. The shell
is rotatable around the axis relative to the housing. The shell
includes a lower edge and extends upward from the lower
edge. The housing includes an aperture centered on the axis.
The aperture defines an airflow outlet from the housing
radially inside the aperture relative to the axis. The sensor
unit defines an airflow inlet radially inside the lower edge
relative to the axis and positioned to receive airflow from the
aperture. The aperture and the lower edge define a gap
extending around the axis. The brush is fixed to one of the
housing or the sensor unit. The bristles extend across the gap
toward the other one of the housing or the sensor unit.

20 Claims, 11 Drawing Sheets

SENSOR ASSEMBLY

BACKGROUND

Vehicles can include a variety of sensors. Some sensors detect internal states of the vehicle, for example, wheel speed, wheel orientation, and engine and transmission values. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (lidar) devices, and image processing sensors such as cameras. A lidar device detects distances to objects by emitting laser pulses and measuring the time of flight for the pulse to travel to the object and back.

DETAILED DESCRIPTION

Figure 1:
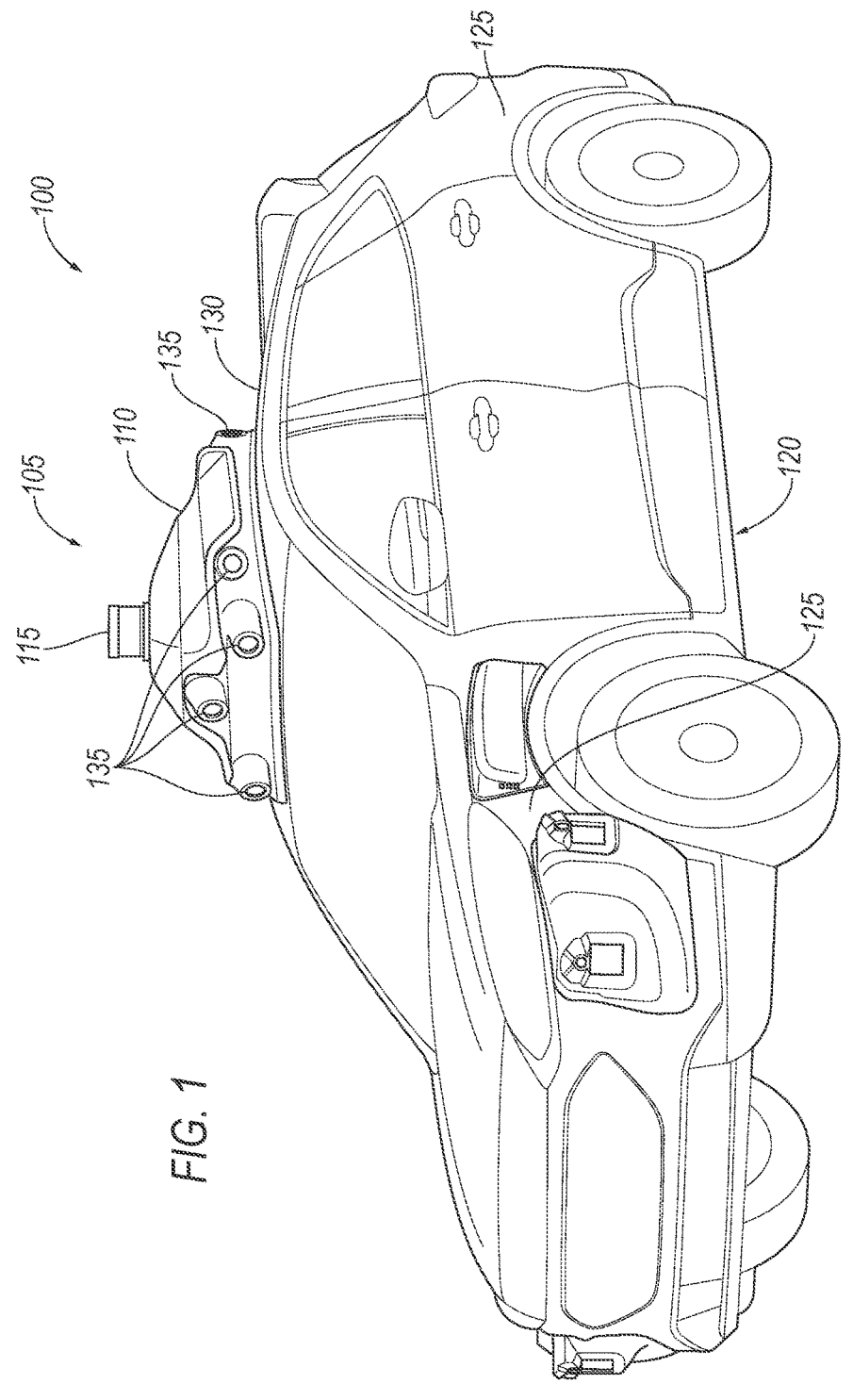
FIG. 1 is a perspective view of an example vehicle with an example sensor assembly.

A sensor assembly includes a housing, a sensor unit attached to the housing, and a brush having a plurality of bristles. The sensor unit includes a shell defining a vertical axis. The shell is rotatable around the axis relative to the housing. The shell includes a lower edge and extends upward from the lower edge. The housing includes an aperture centered on the axis. The aperture defines an airflow outlet from the housing radially inside the aperture relative to the axis. The sensor unit defines an airflow inlet radially inside the lower edge relative to the axis and positioned to receive airflow from the aperture. The aperture and the lower edge define a gap extending around the axis. The brush is fixed to one of the housing or the sensor unit. The bristles extend across the gap toward the other one of the housing or the sensor unit.

In an example, the brush may be elongated on a circular path following the gap around the axis. In a further example, the aperture may include a gutter, and the gutter may be elongated along the aperture and positioned directly below the bristles relative to the axis. In a yet further example, the gutter may include a channel extending from radially inside the lower edge to radially outside the lower edge relative to the axis.

In another further example, the brush may include an elastomeric flap extending between the bristles and elongated on the circular path around the axis.

In an example, the brush may be fixed to one of the aperture or the lower edge of the shell. In a further example, the bristles may extend across the gap toward the other of the aperture or the lower edge of the shell.

In an example, the brush may be fixed to the housing. In a further example, the brush may be fixed to the aperture, and the bristles may extend from the aperture toward the lower edge of the shell. In a yet further example, the bristles may extend upward from the aperture toward the lower edge of the shell.

In another yet further example, the bristles may extend radially inward relative to the axis from the aperture toward the lower edge of the shell.

In another yet further example, the aperture may include a gutter, the gutter may be elongated along the lower edge and positioned directly below the lower edge relative to the axis, and the brush may be positioned in the gutter.

In another yet further example, the sensor assembly may further include a connecting member extending from the aperture to the brush, and the connecting member may have an adjustable length from the aperture to the brush. In a still yet further example, the sensor assembly may further include at least three connecting members including the connecting member, the connecting members may extend from the aperture to the brush, and each connecting member may have an adjustable length from the aperture to the brush. In a further still yet further example, the at least three connecting members may be equally spaced circumferentially around the axis.

In another further still yet further example, the at least three connecting members may be independently adjustable.

In another still yet further example, the bristles at where the connecting member may be connected to the brush are elongated in a same direction as the adjustable length of the connecting member.

In another still yet further example, the connecting member may be a threaded adjuster.

In an example, the sensor unit may include a sensor body fixed relative to the shell and defining a cavity radially between the sensor body and the shell relative to the axis, and the cavity may extend continuously circumferentially around the sensor body relative to the axis.

In another example, the sensor assembly may further include a pressurized-air source positioned to discharge airflow through the airflow outlet.

With reference to the Figures, wherein like numerals indicate like parts throughout the several views, a sensor assembly 105 for a vehicle 100 includes a housing 110, a sensor unit 115 attached to the housing 110, and a brush 705 having a plurality of bristles 720. The sensor unit 115 includes a shell 205 defining a vertical axis A. The shell 205 is rotatable around the axis A relative to the housing 110. The shell 205 includes a lower edge 210 and extends upward along the axis A from the lower edge 210. The housing 110 includes an aperture 305 centered on the axis A. The aperture 305 defines an airflow outlet 915 from the housing 110 radially inside the aperture 305 relative to the axis A. The sensor unit 115 defines an airflow inlet 920 radially inside the lower edge 210 relative to the axis A and positioned to receive airflow from the aperture 305. The aperture 305 and the lower edge 210 define a gap 710 extending around the axis A. The brush 705 is fixed to one of the housing 110 or the sensor unit 115. The bristles 720 extend across the gap 710 toward the other one of the housing 110 or the sensor unit 115.

The sensor assembly 105 provides both cooling and water management for a rotating sensor unit 115 on the stationary housing 110. The airflow outlet 915 defined by the aperture 305 provides a path for airflow into the shell 205, where the airflow can cool components of the sensor unit 115. Because the shell 205 rotates at a high rate of speed relative to the housing 110, the gap 710 is present between the shell 205 and the housing 110. The position of the aperture 305 close to the lower edge 210 of the cylindrical shell 205 permits only a small amount of the airflow to escape through the gap 710 between the aperture 305 and the lower edge 210, making the airflow from the housing 110 to the sensor unit 115 efficient despite the fact that the shell 205 moves relative to the housing 110. Additionally, the brush 705 can occupy part or all of the gap 710, further reducing airflow escape. Because the brush 705 is made of the bristles 720, the brush 705 may bend when contacted by the housing 110 or sensor unit 115, permitting the brush 705 to be placed a distance away that is smaller than the gap 710.

With reference to FIG. 1, the vehicle 100 may be any passenger or commercial automobile such as a car, a truck, a sport utility vehicle, a crossover, a van, a minivan, a taxi, a bus, etc.

The vehicle 100 may include a vehicle body 120. The vehicle body 120 includes body panels 125 partially defining an exterior of the vehicle 100. The body panels 125 may present a class-A surface, e.g., a finished surface exposed to view by a customer and free of unaesthetic blemishes and defects. The body panels 125 include, e.g., a roof 130, etc.

The sensor assembly 105 is attachable to one of the body panels 125 of the vehicle 100, e.g., the roof 130. For example, the housing 110 may be shaped to be attachable to the roof 130, e.g., may have a shape matching a contour of the roof 130. The housing 110 may be attached to the roof 130, which can provide the sensor unit 115 and other sensors 135 mounted inside the housing 110 with an unobstructed field of view of an area around the vehicle 100. The housing 110 may be formed of, e.g., plastic or metal.

Figure 2:
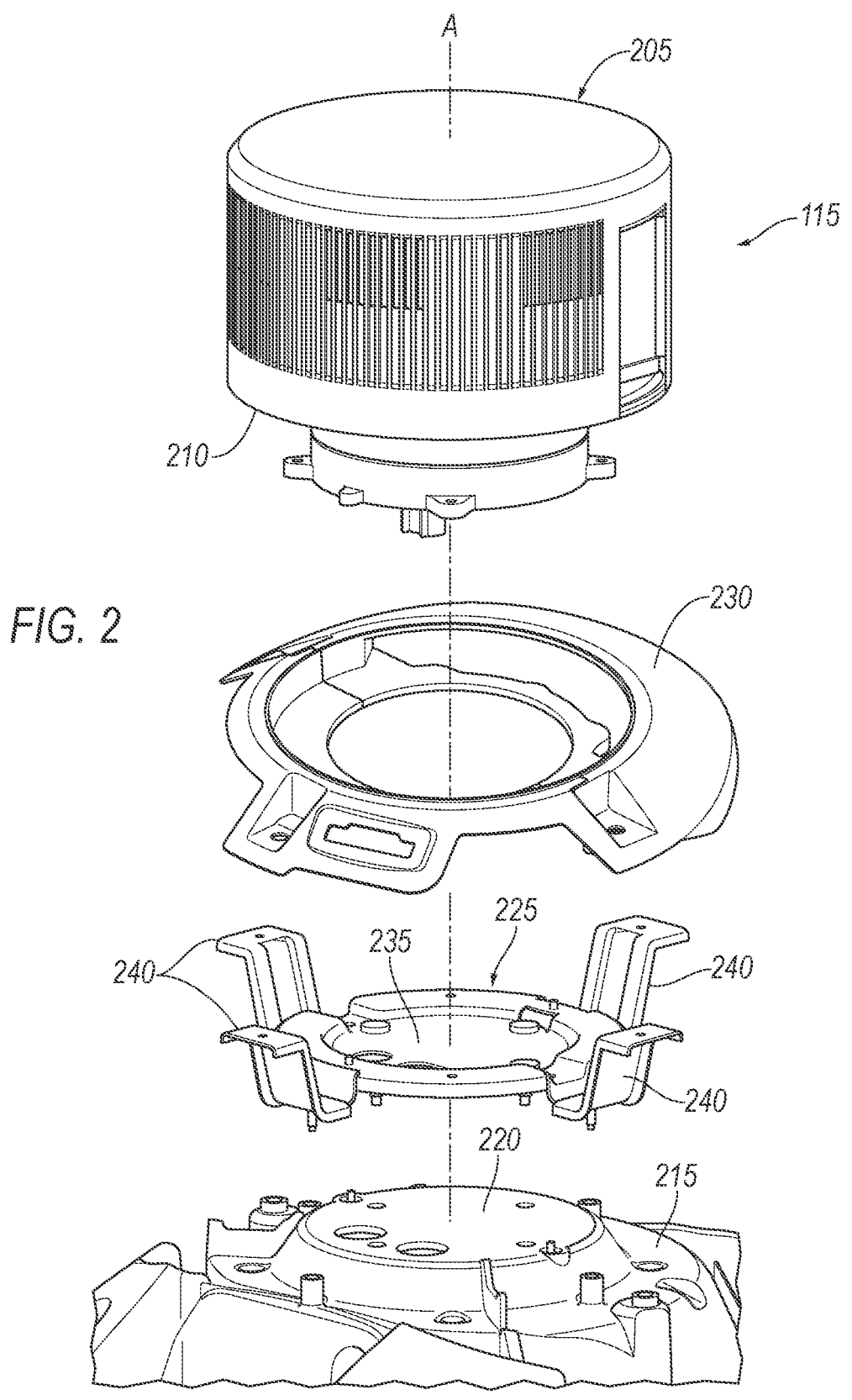
FIG. 2 is an exploded perspective view of a portion of the sensor assembly.
Figure 4:
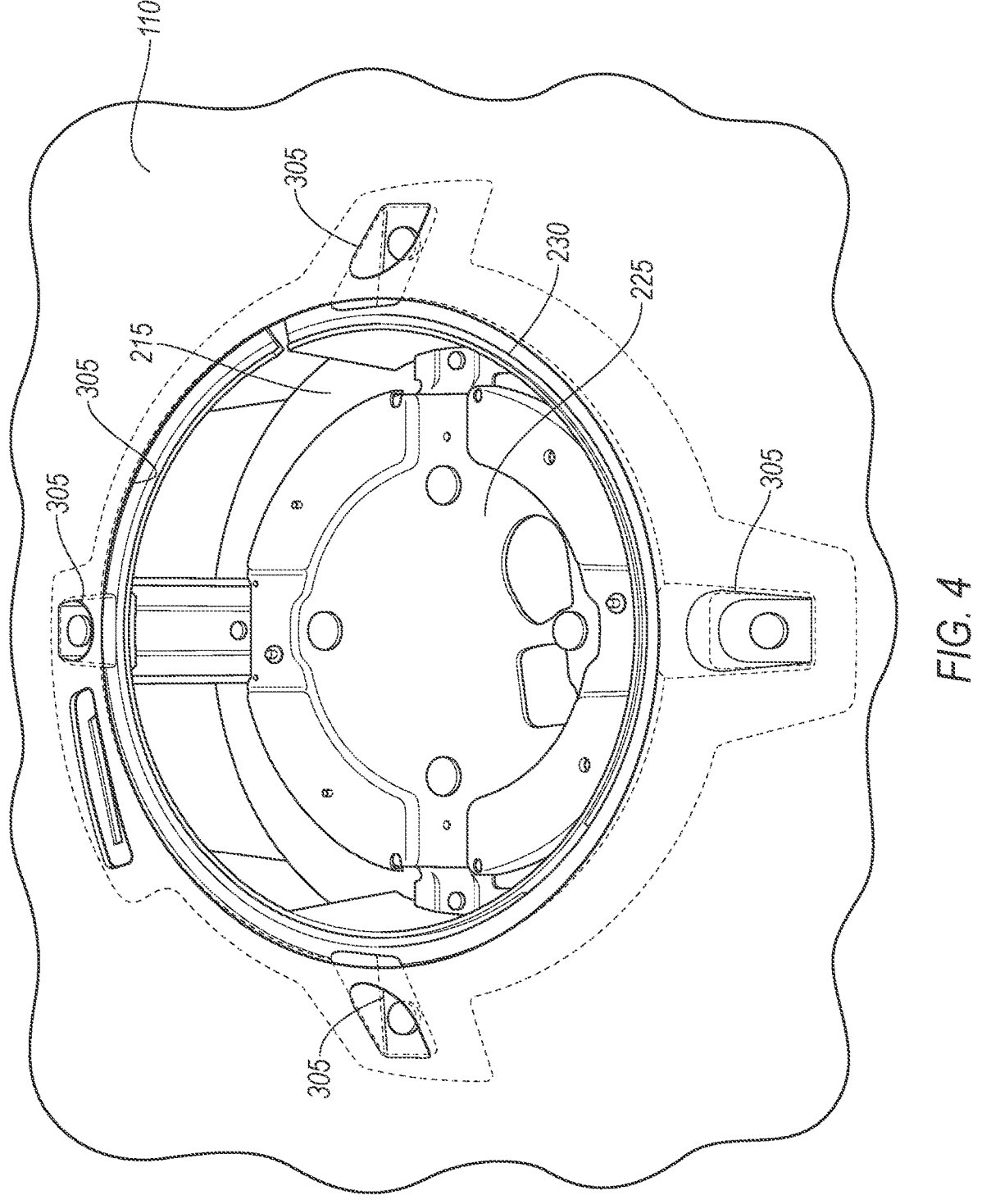
FIG. 4 is a perspective view of a portion of the sensor assembly with a sensor unit removed for illustration.

With reference to FIG. 2, the sensor assembly 105 includes a rigid structure 215. The housing 110 and the rigid structure 215 are shaped to fit together, with the rigid structure 215 positioned inside the housing 110, as seen in FIG. 4. The rigid structure 215 can have a shape matching the contour of the roof 130 like the housing 110 does. The rigid structure 215 can include a mounting platform 220 for directly or indirectly mounting a bracket 225, a gutter 230, and the sensor unit 115. The mounting platform 220 can be round, e.g., can have a circular or slightly elliptical shape, and can be centered on the axis A. The mounting platform 220 can be flat and horizontally level. The rigid structure 215 can be a single piece, i.e., a continuous piece of material with no internal seams separating multiple pieces. For example, the rigid structure 215 can be stamped or molded as a single piece.

The sensor assembly 105 includes the bracket 225 mounted to the rigid structure 215, e.g., fastened to the mounting platform 220. The sensor unit 115 can be mounted to the bracket 225, e.g., fastened through the bracket 225 to the mounting platform 220. The bracket 225 can be a single piece, i.e., a continuous piece of material with no internal seams separating multiple pieces. For example, the bracket 225 can be stamped or molded as a single piece.

The bracket 225 is shaped to accept and fix in place the sensor unit 115, e.g., via fastening. The bracket 225 defines an orientation and position of the sensor unit 115 relative to the vehicle body 120. The position of the sensor unit 115 affords the sensor unit 115 a 360° horizontal field of view of the environment surrounding the vehicle 100, as shown in FIG. 1. The bracket 225 can include a circular base 235 centered on the axis A and a plurality of arms 240 extending radially outward and axially upward from the base 235 relative to the axis A.

The sensor assembly 105 includes the gutter 230. The gutter 230 is fastened to the bracket 225, e.g., to the arms 240 of the bracket 225. The gutter 230 is fixed relative to the housing 110 via the bracket 225. The gutter 230 has a circular shape centered on the axis A. The shape of the gutter 230 is addressed in more detail below. The gutter 230 is part of the aperture 305, as shown in FIG. 4.

Figure 3:
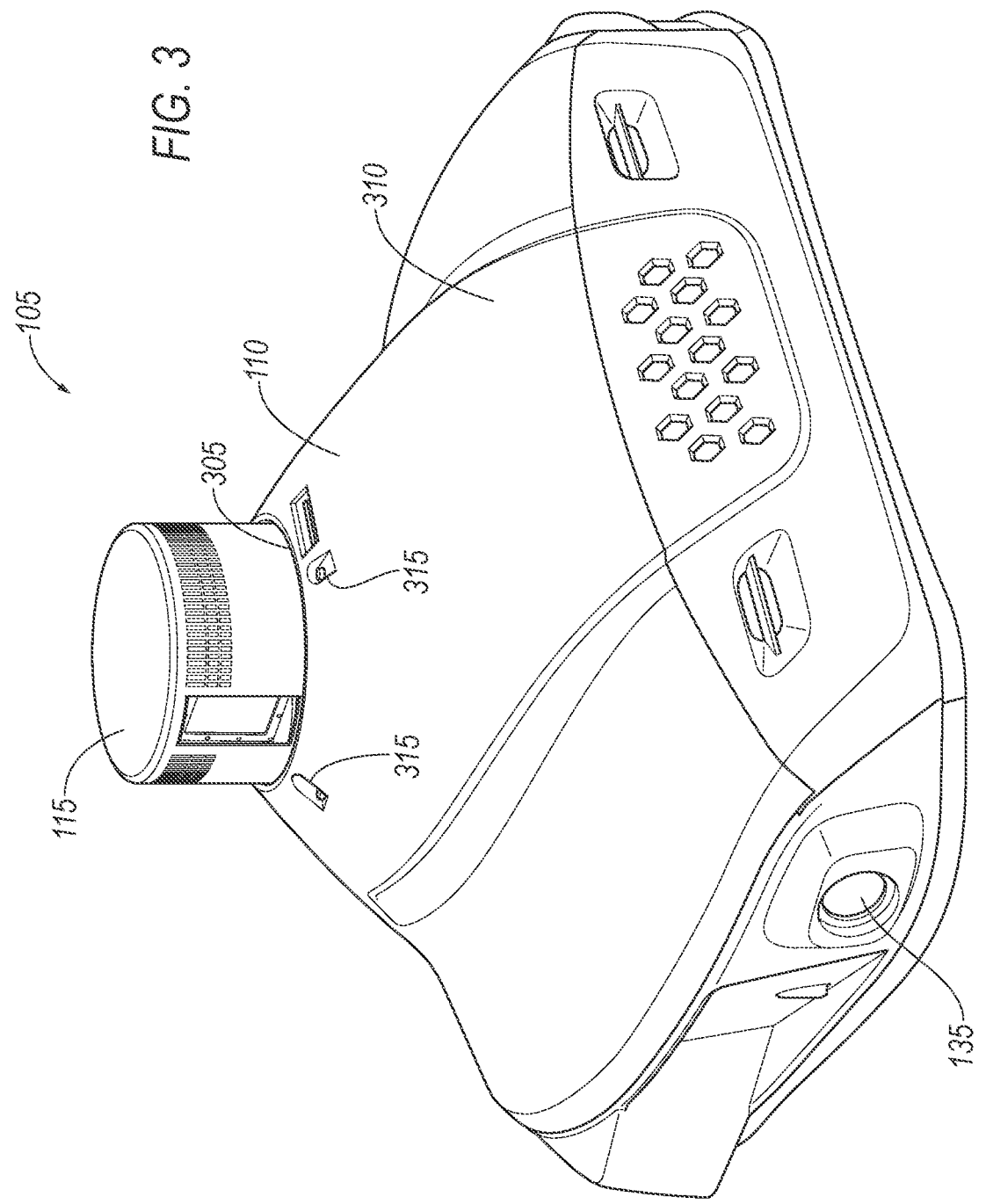
FIG. 3 is a rear perspective view of the sensor assembly.

With reference to FIG. 3, the housing 110 is mounted to the rigid structure 215 and covers the rigid structure 215. The housing 110 contains the other sensors 135. The housing 110 includes an upper surface 310 facing away from the rigid structure 215, i.e., away from the vehicle body 120, and a lower surface 905 facing toward the rigid structure 215, i.e., toward the vehicle body 120 (shown in FIG. 9). The housing 110 may be a single piece, i.e., a continuous piece of material with no internal seams separating multiple pieces. For example, the housing 110 may be stamped or molded as a single piece.

With reference to FIG. 4, the housing 110 includes the aperture 305 through which the sensor unit 115 passes. In the absence of the sensor unit 115 and the bracket 225, the aperture 305 exposes the rigid structure 215. The aperture 305 is round, e.g., has a circular or slightly elliptical shape. The aperture 305 is centered on the axis A. The aperture 305 of the housing 110 is a highest point of the housing 110. The aperture 305 includes the gutter 230.

Figure 5:
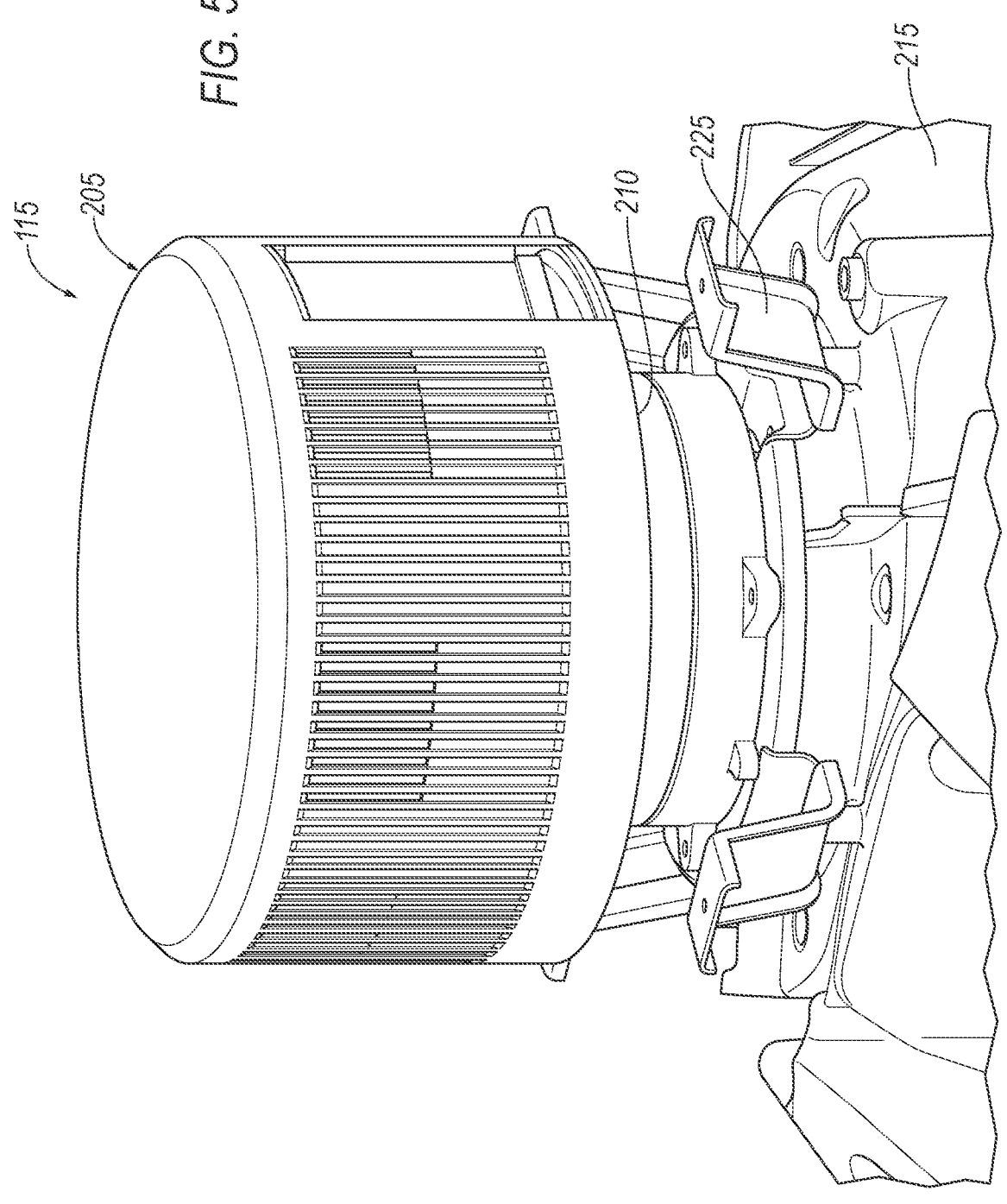
FIG. 5 is a perspective view of a portion of the sensor assembly with a housing and a gutter removed for illustration.

With reference to FIG. 5, the sensor unit 115 is attached, e.g., fastened, to the bracket 225, e.g., to the base 235 of the bracket 225. For example, the sensor unit 115 can be fastened to the rigid structure 215, e.g., through the base 235 of the bracket 225. The sensor unit 115 extends through the aperture 305, as seen in FIG. 3. The shell 205 extends above the aperture 305, i.e., above the highest point of the housing 110.

Returning to FIG. 2, the gutter 230 and the sensor unit 115 are both attached, e.g., fastened, to the bracket 225. The dimensional tolerancing of the sensor unit 115 relative to the gutter 230 is thereby enhanced. Specifically, the gap 710 between the gutter 230 and the shell 205 of the sensor unit 115 can be kept at an intended size more reliably, permitting the intended size to be smaller for less airflow escaping. The dimensional tolerancing can be further enhanced by the bracket 225 being a single piece, as well as by the gutter 230 and the sensor unit 115 directly contacting the bracket 225, i.e., being fastened without intermediate components.

Figure 6:
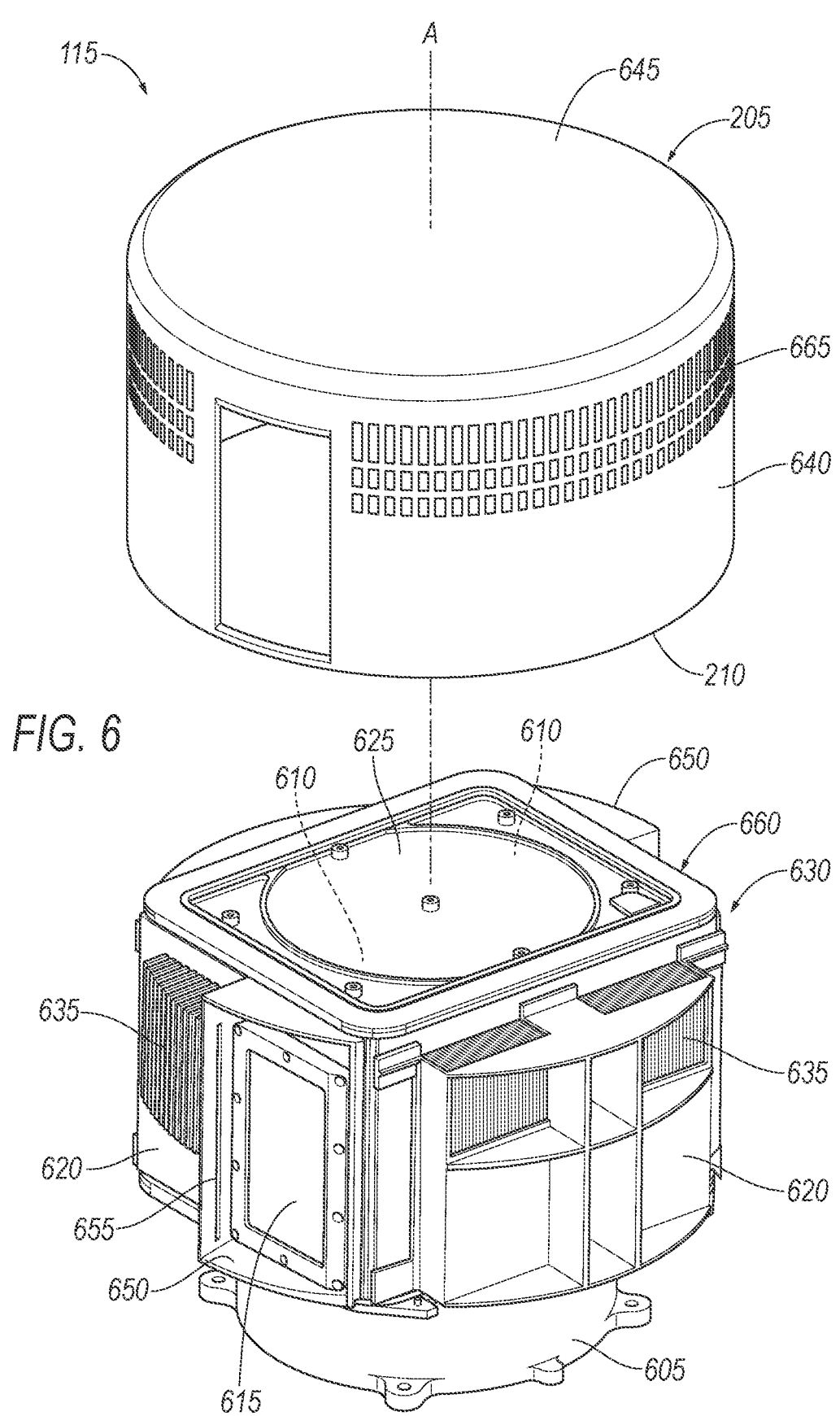
FIG. 6 is an exploded perspective view of the sensor unit.

With reference to FIG. 6, the sensor unit 115 includes a motor 605, a sensor body 660, at least one sensing device 610, at least one sensor window 615, and the shell 205. The motor 605 is attached to and fixed relative to the bracket 225, as shown in FIG. 5. The sensor body 660, the at least one sensing device 610, the at least one sensor window 615, and the shell 205 are fixed relative to each other and are rotatably drivably coupled to the motor 605.

The motor 605 is fixed relative to the bracket 225 and drivably coupled to the sensor body 660 and thereby drivably coupled to the shell 205. The motor 605 can be positioned to rotatably drive the sensor body 660 and the shell 205 relative to the housing 110 in a first direction, e.g., clockwise as seen from above, at a high speed, e.g., 600 revolutions per minute. The motor 605 can be any suitable type for rotating the sensing device 610, e.g., an electric motor 605. For example, the motor 605 can include a stator (not shown) fixed relative to the bracket 225 and a rotor (not shown) rotatable by the stator around the axis A and fixed relative to the sensor body 660.

The sensor body 660 includes walls 620, e.g., four vertical walls 620 as shown in the Figures, and a top panel 625. The walls 620 can have the same horizontal length, e.g., the walls 620 can form a square horizontal cross-section. The horizontal cross-section can be centered on the axis A, i.e., the axis A intersects a geometric center of the horizontal cross-section of the sensor body 660, making the rotation of the sensor body 660 balanced. The top panel 625 extends horizontally to each wall 620. The sensing device 610 is contained inside the sensor body 660. The sensor body 660 is positioned inside the shell 205 and fixed relative to the shell 205.

The sensor body 660 can define a cavity 630 radially between the sensor body 660 and the shell 205 relative to the axis A. The cavity 630 can extend continuously circumferentially around the sensor body 660 relative to the axis A. The term "continuously" in the context of this disclosure means that the cavity 630 is unbroken about the axis A and air may move freely within the cavity 630 and throughout the entire cavity 630. For example, a diagonal corner-to-corner distance across the top panel 625, i.e., a greatest width of the sensor body 660, can be less than an inner diameter of the shell 205.

The sensor body 660 can include a plurality of thermal fins 635. The thermal fins 635 can be positioned on the walls 620. The thermal fins 635 can be oriented parallel to the axis A, i.e., axially relative to the axis A, e.g., elongated vertically along the respective wall 620 for the axis A being vertical. The thermal fins 635 can be positioned on all of the walls 620. The thermal fins 635 on each wall 620 can extend parallel to each other. The thermal fins 635 can extend perpendicularly from the respective wall 620. Each thermal fin can have a length following a direction of elongation of the thermal fin along the wall 620, a width perpendicular to the wall 620, and a thickness in a horizontal direction along the wall 620. The thermal fins 635 can extend along their respective widths radially outward relative to the axis A from the sensor body 660 toward the shell 205. The length can be significantly greater than the width, e.g., more than twice as great. The width can be significantly greater than the thickness, e.g., more than five times as great. The thermal fins 635 can be integral with the walls 620, i.e., made of a single, uniform piece of material with no seams, joints, fasteners, or adhesives holding it together.

The thermal fins 635 can be thermally conductive, i.e., have a high thermal conductivity, e.g., a thermal conductivity equal to at least 15 watts per meter-Kelvin (W/(m K)), e.g., greater than 100 W/(m K), at 25° C. For example, the thermal fins 635, along with the walls 620, may be aluminum. The high thermal conductivity of the thermal fins 635 helps transfer away heat generated by the sensing device 610 inside the sensor body 660, as does the large surface area created by the geometry of the thermal fins 635.

The sensor unit 115 may be designed to detect features of the outside world; for example, the sensor unit 115 may be a radar sensor, an ultrasonic sensor, a scanning laser range finder, a light detection and ranging (lidar) device, or an image processing sensor such as a camera. In particular, the sensor unit 115 may be a lidar device, e.g., a scanning lidar device. A lidar device detects distances to objects by emitting laser pulses at a particular wavelength and measuring the time of flight for the pulse to travel to the object and back. The operation of the sensor unit 115 is performed by the at least one sensing device 610, e.g., a lidar sensing device, inside the sensor body 660. For example, the sensor unit 115 can include two sensing devices 610. The sensing devices 610 have fields of view through the sensor windows 615 encompassing a region from which the sensor unit 115 receives input. As the sensing devices 610 rotate, the fields of view encompass a horizontal 360° around the vehicle 100.

The sensor unit 115 can include at least one sensor window 615, e.g., two sensor windows 615, one sensor window 615 for each sensing device 610. The sensor windows 615 can each be positioned on one of the walls 620. Each sensor window 615 can be off-center on the respective wall 620. For example, the sensor window 615 can be positioned closer to a trailing edge of the respective wall 620 than a leading edge of the wall 620 with respect to the first direction of rotation of the sensor body 660. For example, each sensor window 615 can be positioned in a trailing half of the respective wall 620 with respect to the first direction of rotation. The sensor windows 615 can be flat. For example, the sensor windows 615 can have a rectangular shape. The sensor windows 615 are transparent with respect to whatever medium the sensing device 610 is capable of detecting. For example, if the sensor unit 115 is a lidar device, then the sensor windows 615 are transparent with respect to visible light at the wavelength generated and detectable by the sensing devices 610.

The shell 205 is fixedly attached to the sensor body 660, e.g., fastened to the top panel 625 of the sensor body 660. The shell 205 is rotatable around the axis A relative to the housing 110, along with the sensor body 660.

The shell 205 may have radially symmetric shape, e.g., a cylindrical shape. The shell 205 can include a cylindrical portion 640 and an end portion 645. The end portion 645 can be flat and can have a circular shape. The end portion 645 can be attached, e.g., fastened, to the top panel 625 of the sensor body 660. The shell 205 defines the axis A. The lower edge 210 may have a circular shape. The cylindrical portion 640 can have a cylindrical shape defining the axis A, which is vertical. The cylindrical portion 640 can have a constant circular cross-section extending upward along the axis A from the lower edge 210 to the end portion 645. The shell 205 is open at the lower edge 210, thereby permitting airflow into the sensor unit 115 and permitting attachment of the sensor unit 115.

The shell 205 includes a plurality of slits 665. The slits 665 extend through the cylindrical portion 640 and are elongated parallel to the axis A. The slits 665 can be positioned radially outward from the thermal fins 635 and are elongated parallel to the fins. As described below, the slits 665 permit airflow into the shell 205 to exit from the shell 205.

The sensor windows 615 can be recessed from the shell 205. The sensor unit 115 can include window recesses 650 extending from the sensor window 615 and from the respective wall 620 radially outward to the shell 205. The window recesses 650 can include passages 655 positioned to direct airflow entering the shell 205 across the sensor window 615. For example, the passages 655 can be positioned in the first direction of rotation of the sensor body 660 from the respective sensor windows 615, i.e., as the sensor body 660 rotates, each passage 655 leads the respective sensor window 615. The passages 655 can extend vertically for a height of the respective sensor windows 615.

Figure 7A:
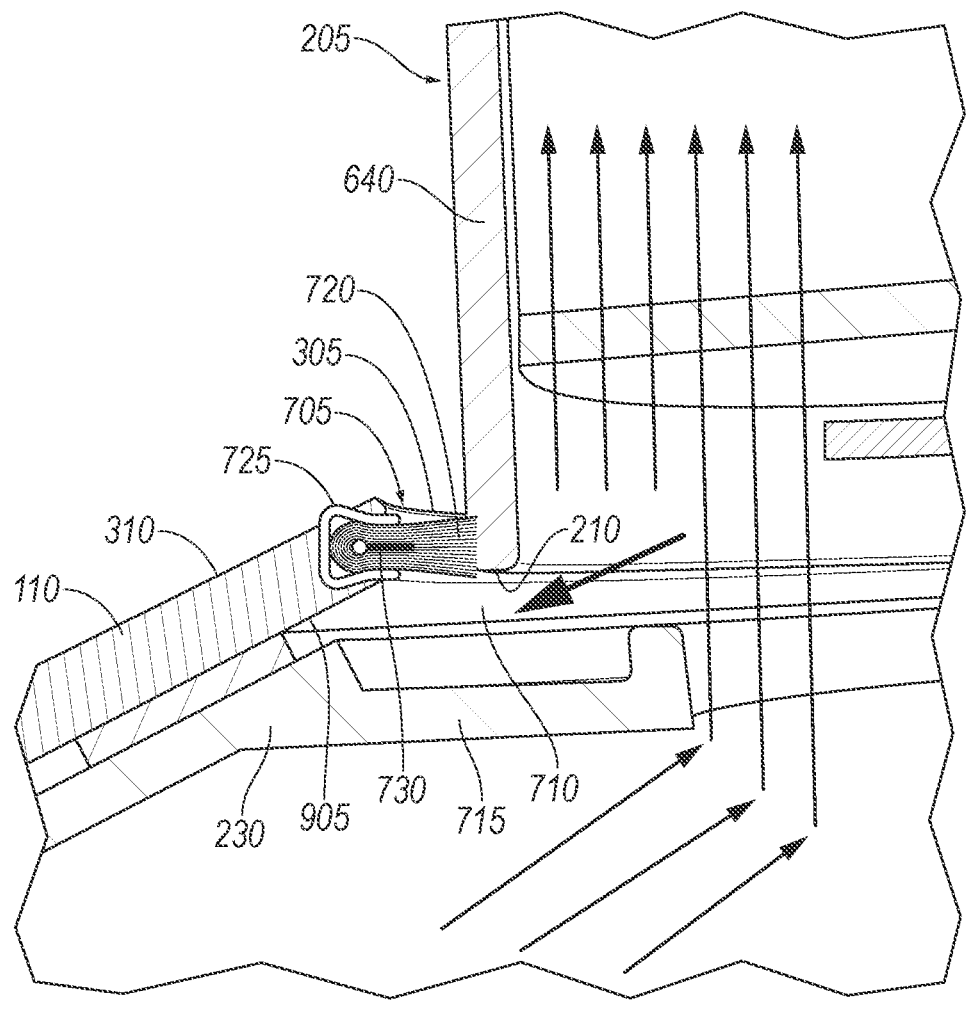
FIG. 7A is a perspective cross-sectional view of a portion of the sensor assembly with an example brush at a first orientation.
Figure 7B:
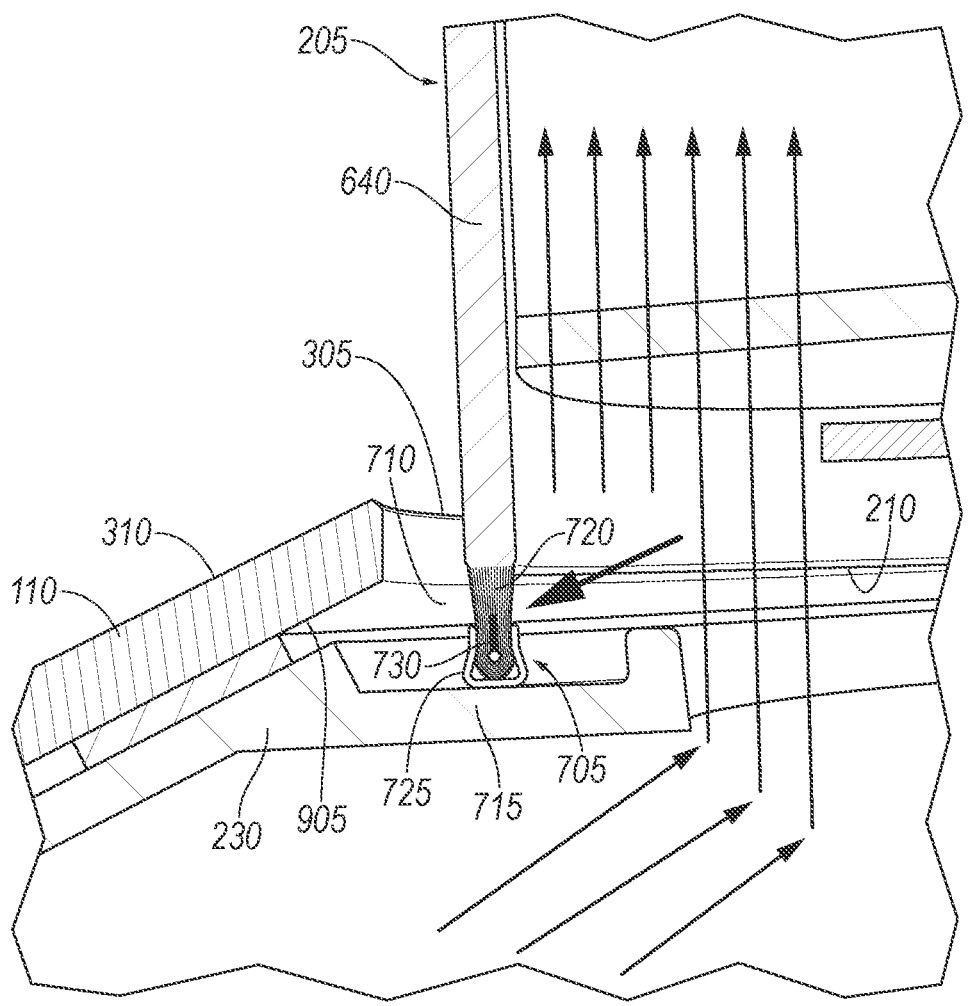
FIG. 7B is a perspective cross-sectional view of a portion of the sensor assembly with the example brush at a second orientation.
Figure 7C:
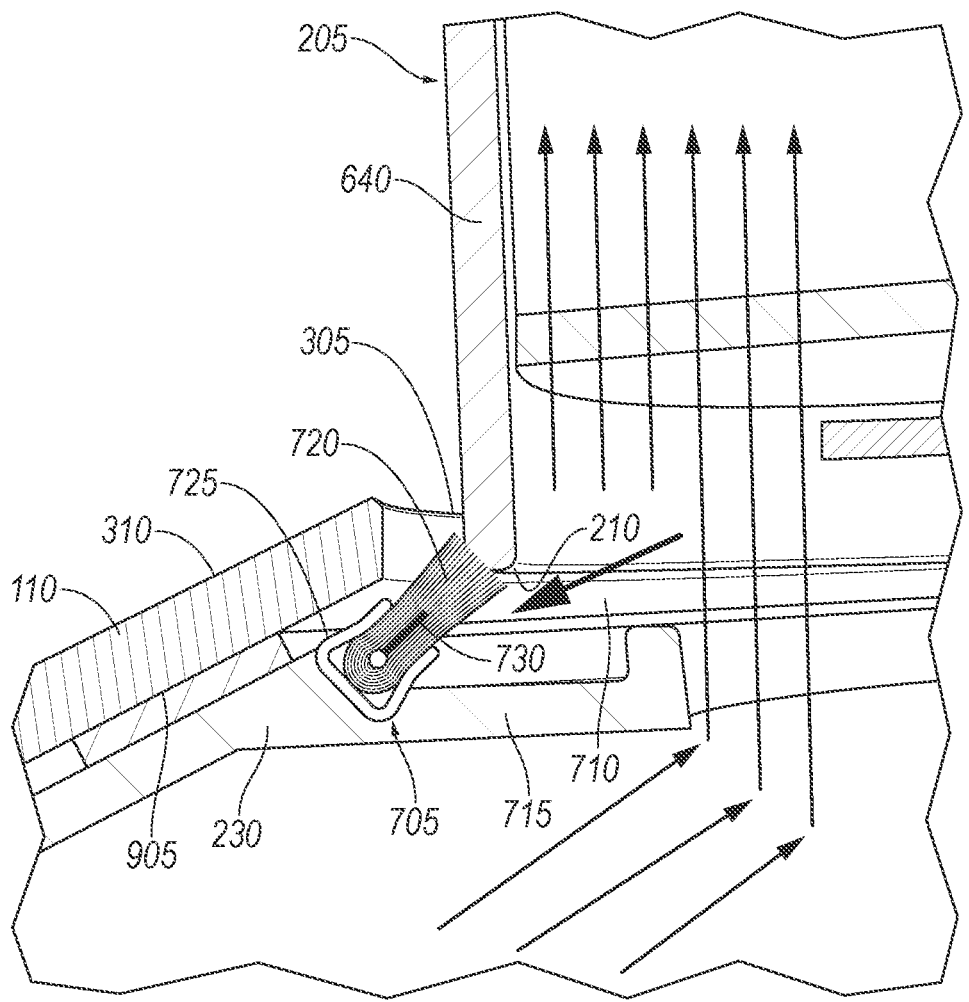
FIG. 7C is a perspective cross-sectional view of a portion of the sensor assembly with the example brush at a third orientation.

With reference to FIGS. 7A-C, the lower edge 210 of the shell 205 is positioned radially inside the aperture 305 relative to the axis A. The lower edge 210 may be positioned at a same height as or below the aperture 305 relative to the axis A. The shell 205 extends above the aperture 305, i.e., above the highest point of the housing 110. The lower edge 210 may be positioned slightly below the aperture 305, and most of the shell 205 is exposed above the housing 110. Positioning the lower edge 210 below the aperture 305 can reduce airflow escaping while flowing from the housing 110 to the shell 205.

The aperture 305 and the lower edge 210 define the gap 710 extending around the axis A. The gap 710 is the shortest distance separating the aperture 305 and the lower edge 210. The gap 710 may have a constant width extending around the axis A. The gap 710 may be radial and/or axial relative to the axis A. For example, a radial distance from the aperture 305 to the lower edge 210 relative to the axis A may be constant around the axis A, and an axial distance from the aperture 305 to the lower edge 210 relative to the axis A may be constant around the axis A.

The gutter 230 is elongated along the aperture 305 and along the lower edge 210 of the shell 205. The gutter 230 is positioned directly below the lower edge 210 relative to the axis A, i.e., straight downward. The gutter 230 includes a channel 715. The channel 715 has a u- or v-shaped cross-section that follows the lower edge 210 of the shell 205. The channel 715, specifically the cross-section of the channel 715, extends from radially inside the lower edge 210 to radially outside the lower edge 210 relative to the axis A, as well as from radially inside the aperture 305 to radially outside the aperture 305 relative to the axis A. A radially outer edge of the channel 715 can be flush against the lower surface 905 of the housing 110 at or radially outside of the aperture 305 relative to the axis A. The position and shape of the gutter 230 helps the gutter 230 catch fluid, e.g., rain or washer fluid, draining from an outside surface of the cylindrical portion 640 of the shell 205.

Returning to FIGS. 3 and 4, the housing 110 includes at least one drain hole 315, e.g., four drain holes 315, positioned to receive fluid from the gutter 230. The drain holes 315 extend radially outward relative to the axis A from the gutter 230. The drain holes 315 extend from the lower surface 905 of the housing 110 at the gutter 230, i.e., from inside the housing 110, to the upper surface 310 of the housing 110, i.e., to outside the housing 110. Fluid can flow from the gutter 230 through the drain holes 315 and down the housing 110 toward the roof 130 of the vehicle 100.

With reference to FIGS. 7A-C, the brush 705 is fixed to one of the housing 110 (e.g., the aperture 305) or the sensor unit 115 (e.g., the lower edge 210 of the shell 205). The brush 705 extends across the gap 710 toward the other one of the housing 110 or the sensor unit 115 (e.g., the other one of the aperture 305 or the lower edge 210). The brush 705 may be elongated along a circular path following the gap 710 around the axis A and centered on the axis A. Accordingly, the brush 705 may be elongated circumferentially relative to the axis A along the aperture 305 and along the lower edge 210. The brush 705 may be positioned directly above the gutter 230, as shown in FIG. 7A, or the brush 705 may be positioned in the gutter 230, as shown in FIGS. 7B-C.

The brush 705 includes a base 725 and a plurality of bristles 720. The brush 705 is attached by the base 725 to the one of the housing 110 or the sensor unit 115. The bristles 720 each extend from one end held by the base 725 to a free end. Each bristle 720 may be elongated in a direction perpendicular to a respective tangent to the circular path along which the brush 705 is elongated, e.g., in a radial and/or axial direction relative to the axis A. The direction of elongation may be noncircumferential relative to the axis A. The bristles 720 extend across the gap 710 from the one of the housing 110 or the sensor unit 115 toward the other one of the housing 110 or the sensor unit 115, e.g., the other one of the aperture 305 or the lower edge 210 of the shell 205. For example, the bristles 720 may extend from the aperture 305 toward the lower edge 210 of the shell 205. The gutter 230 may be positioned directly below the bristles 720 relative to the axis A.

With reference to FIG. 7A, in a first example, the bristles 720 extend radially inward relative to the axis A from the aperture 305 toward the lower edge 210 of the shell 205. The bristles 720 may extend horizontally, i.e., perpendicular to the axis A. The bristles 720 may extend from the aperture 305 part of the way to the lower edge 210 or fully to the lower edge 210, i.e., contacting the lower edge 210. The brush 705 may be fixed to the aperture 305 above the gutter 230. This position and orientation for the brush 705 may prevent debris from entering the housing 110 through the aperture 305.

With reference to FIG. 7B, in a second example, the bristles 720 extend upward from the aperture 305 toward the lower edge 210 of the shell 205. The brush 705 may be attached to the gutter 230, e.g., to a floor to the gutter 230. The bristles 720 extend parallel to the axis A. The bristles 720 may extend from the aperture 305, e.g., from the floor of the gutter 230, part of the way to the lower edge 210 or fully to the lower edge 210, i.e., contacting the lower edge 210. This position and orientation for the brush 705 may provide lower turbulence than the positions shown in FIGS. 7A and 7C.

With reference to FIG. 7C, in a third example, the bristles 720 extend upward and radially inward relative to the axis A from the aperture 305, e.g., the gutter 230, toward the lower edge 210 of the shell 205. The bristles 720 may extend from the aperture 305 part of the way to the lower edge 210 or fully to the lower edge 210, i.e., contacting the lower edge 210. This position and orientation for the brush 705 may provide a balance of the benefits of the first and second examples from FIGS. 7A-B.

With reference to FIGS. 7A-C, the brush 705 may include an elastomeric flap 730 extending between the bristles 720. The flap 730 may be held by the base 725. The flap 730 may be elongated on the circular path around the axis A with the rest of the brush 705. For example, the flap 730 may have a cross-section, e.g., in a plane extending radially and axially relative to the axis A, projected in a circular path around the axis A. The flap 730 may have a width extending parallel to the bristles 720 that are adjacent to the flap 730, e.g., radially inward in the example of FIG. 7A, upward in the example of FIG. 7B, or upward and radially inward in the example of FIG. 7C. The width may be shorter than the lengths of the bristles 720. The bristles 720 may be adjacent to the flap 730 on both sides of the flap 730, i.e., the flap 730 is in a middle of a thickness of the brush 705.

The flap 730 is elastomeric, i.e., is rubber-like, i.e., has a low Young's modulus and a high failure strain. For example, the flap 730 may be EPDM (ethylene propylene diene monomer) rubber. Being elastomeric permits the flap 730 to bend when contacting the other one of the housing 110 or the sensor unit 115, so the flap 730 can be located with a free end closer to the other one of the housing 110 or the sensor unit 115 than a width of the gap 710.

Figure 8:
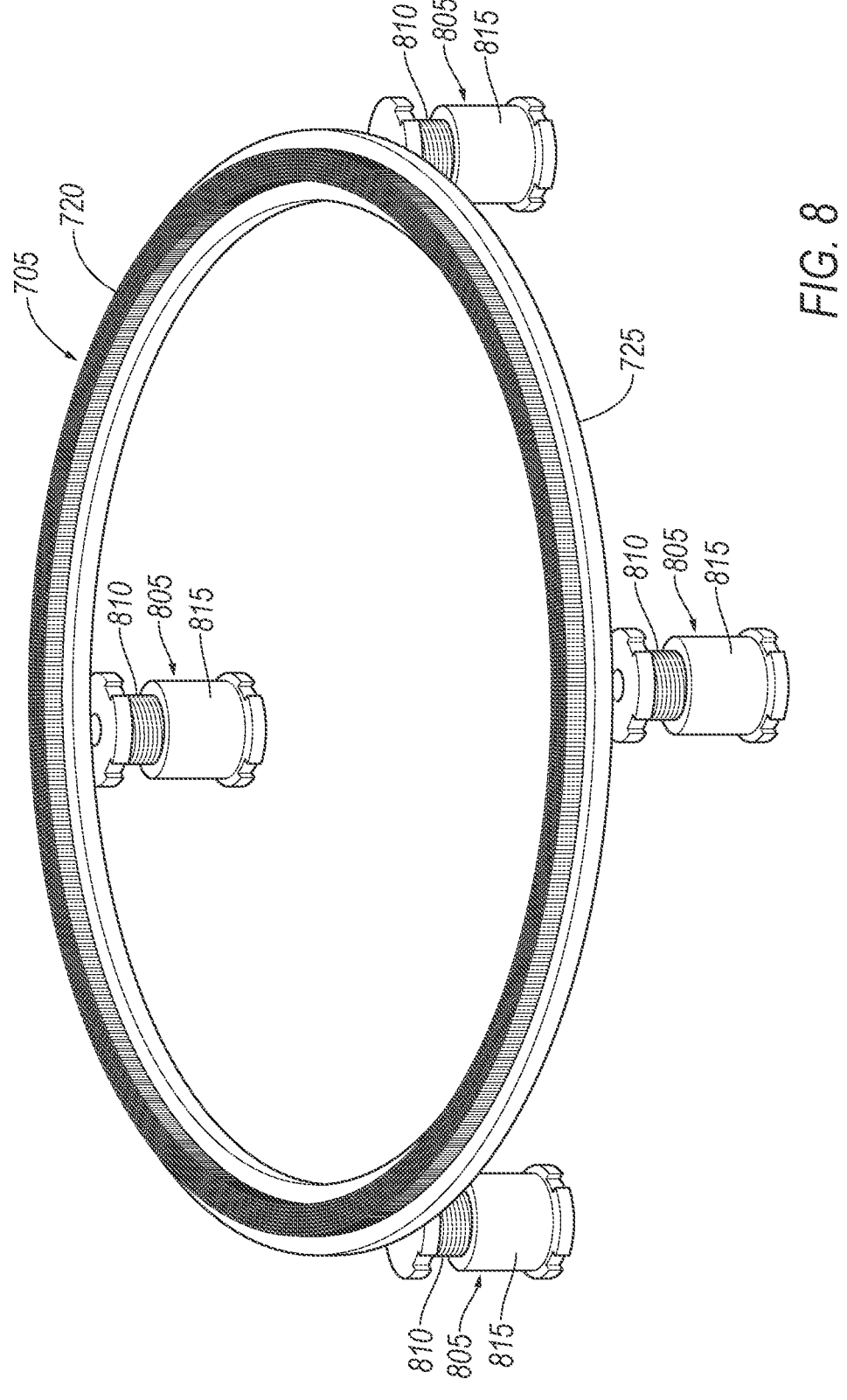
FIG. 8 is a perspective view of the brush with connecting members.

With reference to FIG. 8, the brush 705 may include one or more connecting members 805. Each connecting member 805 extends from the one of the aperture 305 or the lower edge 210 of the shell 205 to which the brush 705 is attached to the brush 705, e.g., to the base 725 of the brush 705. The brush 705 may be attached to the one of the aperture 305 or the lower edge 210 of the shell 205 via the connecting members 805. For example, the connecting members 805 may extend from the aperture 305 to the brush 705. The brush 705 may be attached to the aperture 305 only via the connecting members 805.

Each connecting member 805 has an adjustable length from the aperture 305 (or the lower edge 210) to the brush 705. For example, the connecting members 805 may be threaded adjusters, in which a threaded rod 810 and a threaded retainer 815 are engaged via the threads. One of the threaded rod 810 and threaded retainer 815 is rotatable, and the other is fixed. Rotation of the threaded rod 810 or threaded retainer 815 in one direction screws the threaded rod 810 into the threaded retainer 815, thereby shortening the adjustable length, and rotation of the threaded rod 810 or threaded retainer 815 in the other direction unscrews the threaded rod 810 from the threaded retainer 815, thereby lengthening the adjustable length. The adjustable lengths of the connecting members 805 are useful for fine-tuning the installation of the brush 705, e.g., the positions of the free ends of the bristles 720, as well as for compensating for wear that causes shortening of the bristles 720 over time. The connecting members 805 may be independently adjustable, i.e., the adjustable length of each connecting member 805 may be changed without affecting the adjustable lengths of the other connecting members 805. Independent adjustment helps installation and is also useful for uneven wear of the bristles 705 over time. The bristles 720 where each connecting member 805 is connected to the brush 705 may be elongated in a same direction as the adjustable length of that connecting member 805. Adjustment of the lengths is thus directly across the gap 710.

The connecting members 805 may include at least three connecting members 805, thereby defining a geometric plane containing the circular shape of the brush 705. For example, the connecting members 805 may include four connecting members 805, as shown in FIG. 8. The connecting members 805 may be equally spaced circumferentially around the axis A, which helps ensure independent adjustment of the adjustable lengths.

Figure 9:
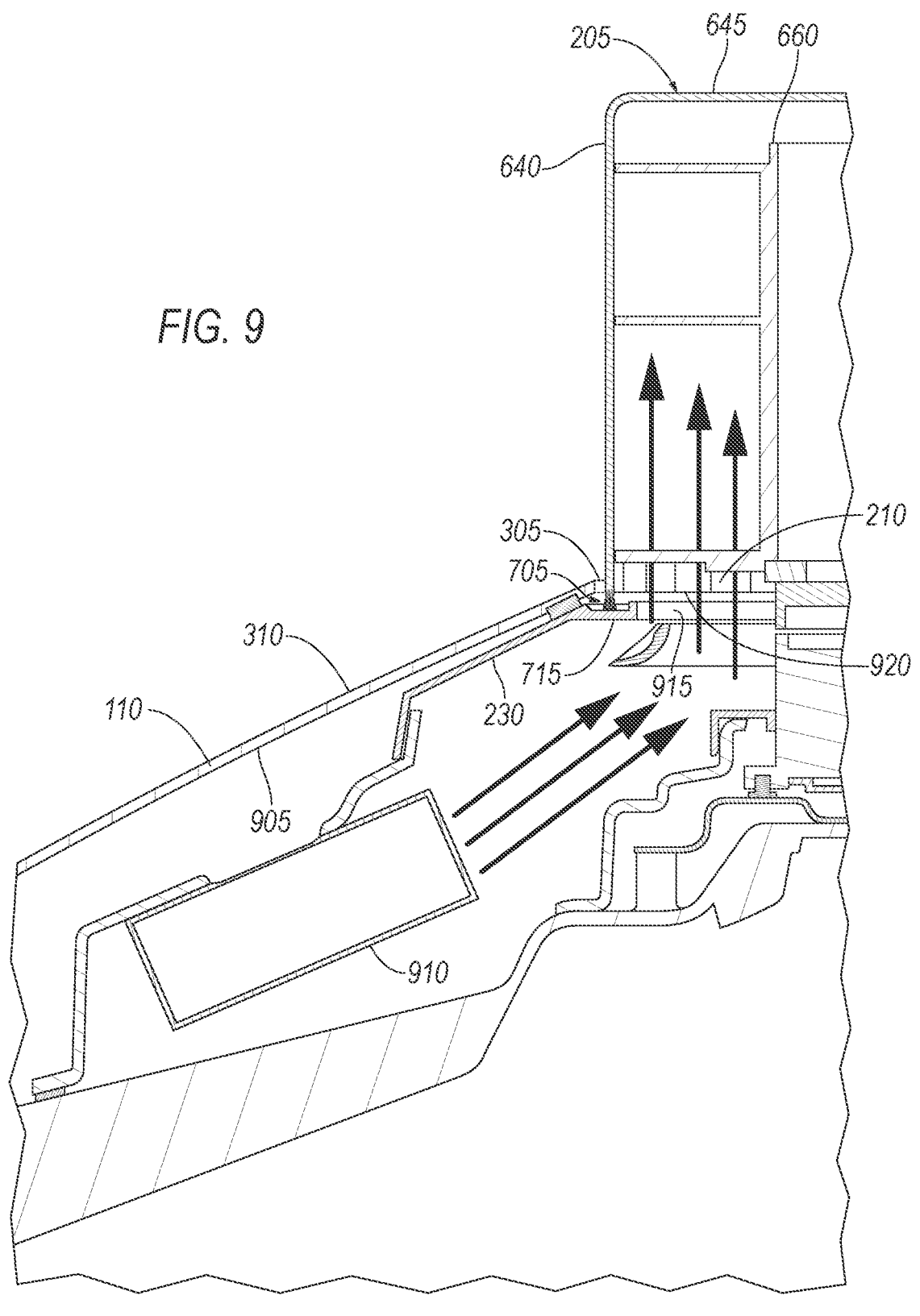
FIG. 9 is a diagrammatic side cross-sectional view of the sensor assembly.

With reference to FIG. 9, the sensor assembly 105 includes a pressurized-air source 910. The pressurized-air source 910 can be positioned inside the housing 110. The pressurized-air source 910 may be any suitable type of blower, e.g., a fan, or suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

The pressurized-air source 910 can be positioned to supply airflow from the housing 110 through the aperture 305 into the shell 205, e.g., to discharge airflow between the arms 240 of the bracket 225 and then through the airflow outlet 915 defined by the aperture 305. For example, the pressurized-air source 910 can be fluidly connected to a space between the rigid structure 215 and the housing 110 through which the pressurized air can flow to the bracket 225, then between the arms 240, then exiting through the airflow outlet 915. The aperture 305 defines the airflow outlet 915 passing radially inside the aperture 305 relative to the axis A, e.g., radially inside an inner edge of the channel 715 of the gutter 230.

The sensor unit 115 defines the airflow inlet 920 radially inside the lower edge 210 of the shell 205 relative to the axis A. The airflow inlet 920 is positioned to receive airflow from the aperture 305, e.g., the airflow inlet 920 encircles the airflow outlet 915, i.e., the lower edge 210 encircles the radially inner edge of the channel 715 of the gutter 230. The thermal fins 635 and the slits 665 are positioned to receive airflow from the airflow inlet 920. For example, airflow that passes from the housing 110 through the airflow inlet 920 passes between the thermal fins 635 and then exits the sensor unit 115 through the slits 665. The airflow thus transfers heat from the sensor body 660, thereby cooling the sensor body 660 and the sensing device 610. The airflow is vertical through the airflow inlet 920, and the vertical orientation of the thermal fins 635 and the slits 665 facilitates smooth airflow.

The brush 705, as well as possibly the flap 730, provides for low levels of lost airflow from the housing 110 to the sensor unit 115. Because the flap 705 is flexible, the flap 705 may be located closer to the lower edge 210 (if attached to the housing 110) or closer to the aperture 305 (if attached to the sensor unit 115) than a distance between the aperture 305 and the lower edge 210. If the bristles 720 extend all the way across the gap 710, then air must pass between the bristles 720 to escape. The escaping air is thereby reduced.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor assembly comprising:
a housing;
a sensor unit attached to the housing; and
a brush having a plurality of bristles;
the sensor unit including a shell defining a vertical axis;
the shell being rotatable around the axis relative to the housing;
the shell including a lower edge and extending upward along the axis from the lower edge;
the housing including an aperture centered on the axis;
the aperture defining an airflow outlet from the housing radially inside the aperture relative to the axis;
the sensor unit defining an airflow inlet radially inside the lower edge relative to the axis and positioned to receive airflow from the aperture;
the aperture and the lower edge defining a gap extending around the axis;
the brush fixed to one of the housing or the sensor unit; and
the bristles extending across the gap toward the other one of the housing or the sensor unit.

2. The sensor assembly of claim 1, wherein the brush is elongated on a circular path following the gap around the axis.

3. The sensor assembly of claim 2, wherein the aperture includes a gutter, and the gutter is elongated along the aperture and positioned directly below the bristles relative to the axis.

4. The sensor assembly of claim 3, wherein the gutter includes a channel extending from radially inside the lower edge to radially outside the lower edge relative to the axis.

5. The sensor assembly of claim 2, wherein the brush includes an elastomeric flap extending between the bristles and elongated on the circular path around the axis.

6. The sensor assembly of claim 1, wherein the brush is fixed to one of the aperture or the lower edge of the shell.

7. The sensor assembly of claim 6, wherein the bristles extend across the gap toward the other of the aperture or the lower edge of the shell.

8. The sensor assembly of claim 1, wherein the brush is fixed to the housing.

9. The sensor assembly of claim 8, wherein the brush is fixed to the aperture, and the bristles extend from the aperture toward the lower edge of the shell.

10. The sensor assembly of claim 9, wherein the bristles extend upward from the aperture toward the lower edge of the shell.

11. The sensor assembly of claim 9, wherein the bristles extend radially inward relative to the axis from the aperture toward the lower edge of the shell.

12. The sensor assembly of claim 9, wherein the aperture includes a gutter, the gutter is elongated along the lower edge and positioned directly below the lower edge relative to the axis, and the brush is positioned in the gutter.

13. The sensor assembly of claim 9, further comprising a connecting member extending from the aperture to the brush, wherein the connecting member has an adjustable length from the aperture to the brush.

14. The sensor assembly of claim 13, further comprising at least three connecting members including the connecting member, wherein the connecting members extend from the aperture to the brush, and each connecting member has an adjustable length from the aperture to the brush.

15. The sensor assembly of claim 14, wherein the at least three connecting members are equally spaced circumferentially around the axis.

16. The sensor assembly of claim 14, wherein the at least three connecting members are independently adjustable.

17. The sensor assembly of claim 13, wherein the bristles at where the connecting member is connected to the brush are elongated in a same direction as the adjustable length of the connecting member.

18. The sensor assembly of claim 13, wherein the connecting member is a threaded adjuster.

19. The sensor assembly of claim 1, wherein the sensor unit includes a sensor body fixed relative to the shell and defining a cavity radially between the sensor body and the shell relative to the axis, and the cavity extends continuously circumferentially around the sensor body relative to the axis.

20. The sensor assembly of claim 1, further comprising a pressurized-air source positioned to discharge airflow through the airflow outlet.

\* \* \* \* \*